United States Patent
Bryant et al.

(10) Patent No.: US 9,391,432 B2
(45) Date of Patent: Jul. 12, 2016

(54) POWER TRANSMISSION ASSEMBLY

(71) Applicant: General Electric Company, Schenectady, NY (US)

(72) Inventors: Michael Ray Bryant, Gibsonville, NC (US); Suresh Redditha, Andhra Pradesh (IN); Kalla Srinivasa Rao, Andhra Pradesh (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 134 days.

(21) Appl. No.: 13/961,585

(22) Filed: Aug. 7, 2013

(65) Prior Publication Data

US 2015/0041209 A1    Feb. 12, 2015

(51) Int. Cl.
 *H02B 1/20*    (2006.01)
(52) U.S. Cl.
 CPC ......................... *H02B 1/20* (2013.01)
(58) Field of Classification Search
 CPC ........................................................ H02B 1/20
 USPC ............................. 174/70 B, 99 B, 71 B, 68.2
 See application file for complete search history.

(56) References Cited

U.S. PATENT DOCUMENTS

| | | | | |
|---|---|---|---|---|
| 2,039,025 A | * | 4/1936 | Papst | H02G 5/02 174/129 B |
| 2,053,561 A | * | 9/1936 | Jennison | H02G 5/025 174/129 B |
| 2,955,147 A | * | 10/1960 | Carlson | H02G 5/06 174/68.2 |
| 3,213,300 A | * | 10/1965 | Davis | H02G 5/06 174/68.2 |
| 3,219,887 A | * | 11/1965 | Gerg | H02B 1/21 174/99 B |
| 3,384,856 A | * | 5/1968 | Fisher | H02G 5/06 174/68.2 |
| 4,118,639 A | * | 10/1978 | Rosey | H02B 1/21 174/99 B |
| 4,199,655 A | | 4/1980 | Shariff et al. | |
| 4,740,864 A | | 4/1988 | Stanfield et al. | |
| 5,101,080 A | | 3/1992 | Ferenc | |

(Continued)

FOREIGN PATENT DOCUMENTS

| | | |
|---|---|---|
| EP | 616402 B1 | 11/1996 |
| EP | 773616 B1 | 3/2002 |

(Continued)

OTHER PUBLICATIONS

Part V Busbar Systems, Chater 28 p. 983 "Carriying power through metal-enclosed bus systems".*
Allen-Bradley "Centerline 2100 Low Voltage Motor Control Centers", Rockwell Automation Publication 2100-IN012E-EN-P—Feb. 2012, pp. 1-112, 2012.

*Primary Examiner* — Timothy Thompson
*Assistant Examiner* — Michael F McAllister
(74) *Attorney, Agent, or Firm* — GE Global Patent Operation; Stephen G. Midgley

(57) ABSTRACT

A power transmission assembly includes a first main bus including a first large bus bar and a first small bus bar. The first large bus bar is defined by a cross-sectional area larger than the first small bus bar. The first main bus defines a first axis passing through the first large bus bar and the second small bus bar. The power transmission assembly includes a second main bus including a second large bus bar and a second small bus bar. The second main bus defines a second axis passing through the second large bus bar and the second small bus bar, the second axis being substantially parallel to the first axis. The first main bus is located along a third axis substantially perpendicular to the first axis and passing through each of the first main bus and the second main bus.

17 Claims, 6 Drawing Sheets

(56) References Cited

U.S. PATENT DOCUMENTS

| | | |
|---|---|---|
| 5,157,584 A | 10/1992 | Rowe |
| 6,141,206 A | 10/2000 | Bruner et al. |
| 6,269,000 B1 | 7/2001 | McCarrol |
| 6,420,655 B1 | 7/2002 | Yang et al. |
| 6,489,567 B2 * | 12/2002 | Zachrai ............... H02G 5/025 174/149 B |
| 6,646,861 B1 | 11/2003 | Watanabe et al. |
| 6,786,749 B2 * | 9/2004 | Meiners ............... H02G 5/00 174/71 B |
| 6,934,147 B2 * | 8/2005 | Miller ............... H02B 1/21 174/68.2 |
| 7,528,612 B2 | 5/2009 | Gollhardt et al. |
| 7,561,412 B2 | 7/2009 | Brandt et al. |
| 7,576,985 B2 | 8/2009 | Kingston |
| 8,258,404 B2 | 9/2012 | Latimer |
| 2006/0121796 A1 | 6/2006 | Josten et al. |
| 2010/0051342 A1 * | 3/2010 | Diaz ............... H02B 1/21 174/350 |
| 2010/0314166 A1 * | 12/2010 | Malkowski, Jr. ......... H02B 1/21 174/72 B |
| 2012/0033351 A1 | 2/2012 | Morris et al. |

FOREIGN PATENT DOCUMENTS

| | | |
|---|---|---|
| EP | 1271727 A1 | 1/2003 |
| EP | 865132 B1 | 1/2007 |
| EP | 1619766 B1 | 10/2007 |
| EP | 2383849 A1 | 11/2011 |
| WO | 2007033947 A1 | 3/2007 |
| WO | 2007033948 A1 | 3/2007 |
| WO | 2010025184 A1 | 3/2010 |
| WO | 2010077594 A2 | 7/2010 |

* cited by examiner

POWER TRANSMISSION ASSEMBLY

BACKGROUND OF THE INVENTION

The subject matter disclosed herein relates to a bus bar assembly and in particular to conductive bus bars for providing power to electrical systems.

Power transmission systems, including motor control systems, transmit power in multiple phases along power buses that comprise conductive bars. Main power buses, which are referred to in the vernacular of power transmission systems as horizontal buses, are typically connected to a power source. Auxiliary buses, which are referred to in the vernacular of power transmission systems as riser buses or vertical buses, extend from the main buses to connect to power-receiving devices and other connectors.

The size of the bars determines a current rating of the power buses, and larger buses corresponding to higher current ratings tend to generate more heat than smaller buses, requiring ventilation to maintain equipment at predetermined temperatures.

BRIEF DESCRIPTION OF THE INVENTION

According to one aspect of the invention, a power transmission assembly includes a first main bus including a first large bus bar and a first small bus bar. The first large bus bar is defined by a cross-sectional area larger than the first small bus bar. The first main bus defines a first axis passing through the first large bus bar and the second small bus bar. The power transmission assembly includes a second main bus including a second large bus bar and a second small bus bar. The second main bus defines a second axis passing through the second large bus bar and the second small bus bar, the second axis being substantially parallel to the first axis. The first main bus is located along a third axis substantially perpendicular to the first axis and passing through each of the first main bus and the second main bus.

According to another aspect of the invention, a power transmission apparatus including a first main bus including a first plurality of bus bars including at least one first large bus bar and at least one first small bus bar. The large and small sizes are defined by a cross-sectional area of the bus bars, the first main bus defining a first axis passing through each of the first plurality of bus bars. The power transmission apparatus further includes a second main bus including a second plurality of bus bars including at least one second large bus bar and at least one second small bus bar, the second main bus defining a second axis passing through each of the second plurality of bus bars. The second axis is substantially parallel to the first axis, and the first main bus and the second main bus are arranged such that a third axis substantially perpendicular to the first and second axes passes through each of the first main bus and the second main bus.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
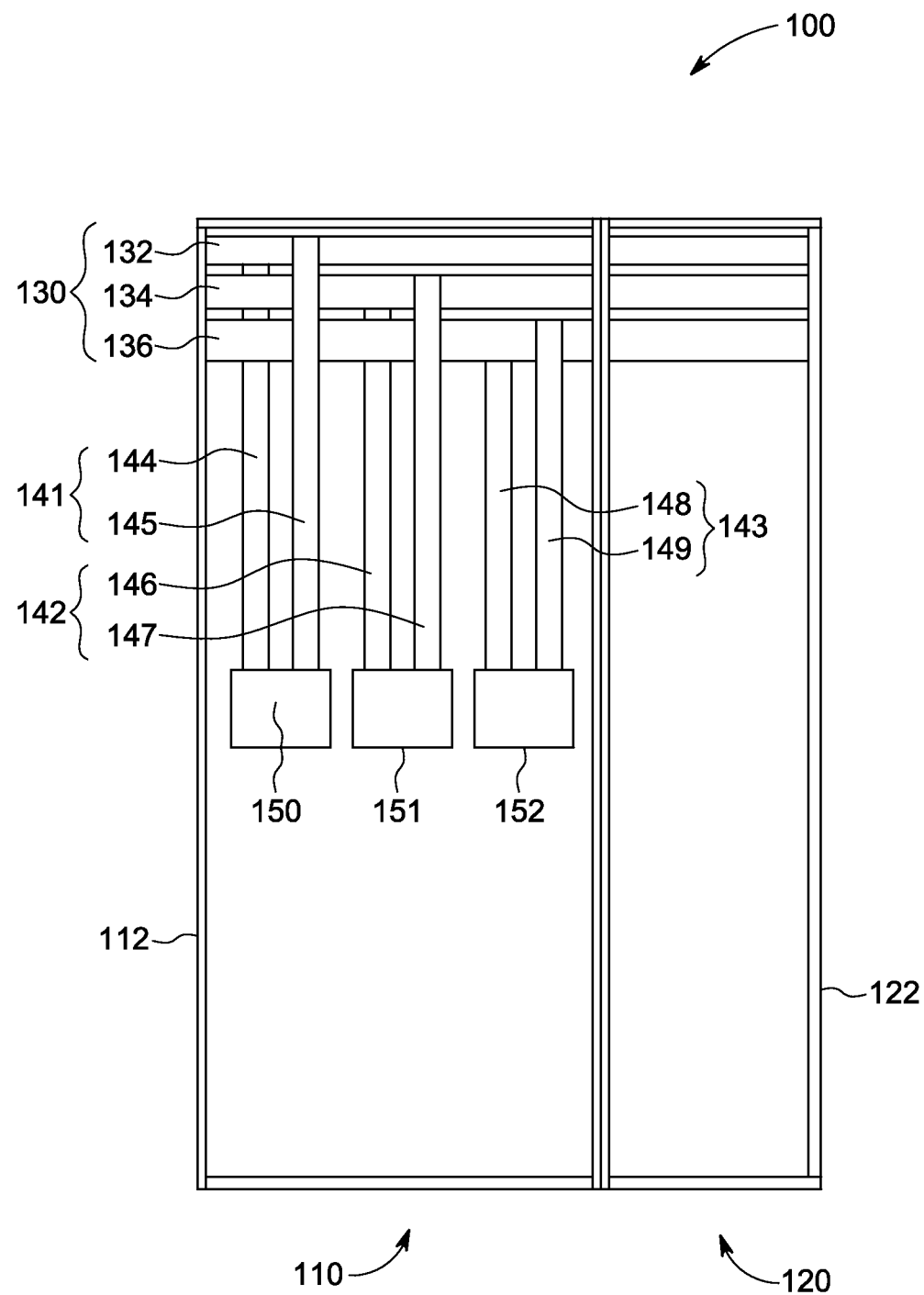
FIG. 1 is a bus bar assembly according to an embodiment of the invention.

FIG. 1 illustrates a power transmission housing 100 according to an embodiment of the invention. As illustrated, the power transmission housing is a motor control center. The power transmission housing 100 houses a bus bar assembly including a main bus assembly 130 arranged in a first direction in the motor control center 100 and auxiliary buses 141, 142 and 143 that extend from the main bus assembly 130 to power connectors 150, 151 and 152, respectively. In embodiments of the present invention, the auxiliary buses 141, 142 and 143 extend from the main bus assembly 130 at an angle that crosses the main bus assembly 130. For example, in one embodiment, the main bus assembly 130 extends horizontally, or substantially horizontally, and the auxiliary buses 141, 142 and 143 extend vertically, or substantially vertically.

In FIG. 1, the main bus assembly 130 includes three main buses 132, 134 and 136, each main bus 132, 134 and 136 corresponding to a different phase of a three-phase power signal. In the present specification, the main buses are referred to as a first main bus 132, a second main bus 134 and a third main bus 136. However, embodiments of the invention encompass any number of main buses corresponding to any number of phases of a power signal, including two main buses corresponding to two phases, four main buses corresponding to four phases or any other desired number of main buses.

In FIG. 1 each auxiliary bus 141, 142 and 143 includes two bus bars 144 and 145, 146 and 147, and 148 and 149, respectively. However, embodiments of the invention encompass any number of auxiliary bus bars connected to each main bus 132, 134 and 136, including one auxiliary bus bar, three auxiliary bus bars, or any other desired number of auxiliary bus bars.

FIG. 1 illustrates a power transmission housing 100 having first and second sections 110 and 120. In FIG. 1, the first section 110 is made up of a housing 112 which houses the main bus assembly 130, auxiliary buses 141, 142 and 143 and the power connectors 150, 151 and 152. The second section 120 includes a housing 122 and the main bus assembly 130 extends into the second section 120. The main bus bar assembly 130 extends into the second section 120 and may connect to a power source, to additional auxiliary buses or to any other devices or circuitry. While FIG. 1 illustrates a power transmission housing 100 having two sections, it is to be understood that embodiments of the invention encompass power transmission housings having any number of sections.

In embodiments of the invention, the power connectors 150, 151 and 152 connect to power-receiving devices (not shown). For example, the power connectors 150, 151 and 152 may be connected to a motor to drive the motor with a multiple-phase power input. In such an embodiment, the power connectors 150, 151 and 152 connect to the motor via a tap or circuit breaker and a starter. However, embodiments of the invention encompass power transmission housings and power bus assemblies that receive power from any power source and supply power to any power-receiving device. In addition, power may be supplied to the main bus assembly 130 via vertical bus bars or risers, similar to the auxiliary bus bars 141, 142 and 143.

In embodiments of the invention, each main bus 132, 134 and 136 is formed of multiple bus bars having different widths. The multiple bus bars of each main bus 132, 134 and 136 may be arranged in different patterns to provide for a higher current rating of the main buses 132, 134 and 136 without the need for forced ventilation in the power transmission housing 100.

Figure 2:
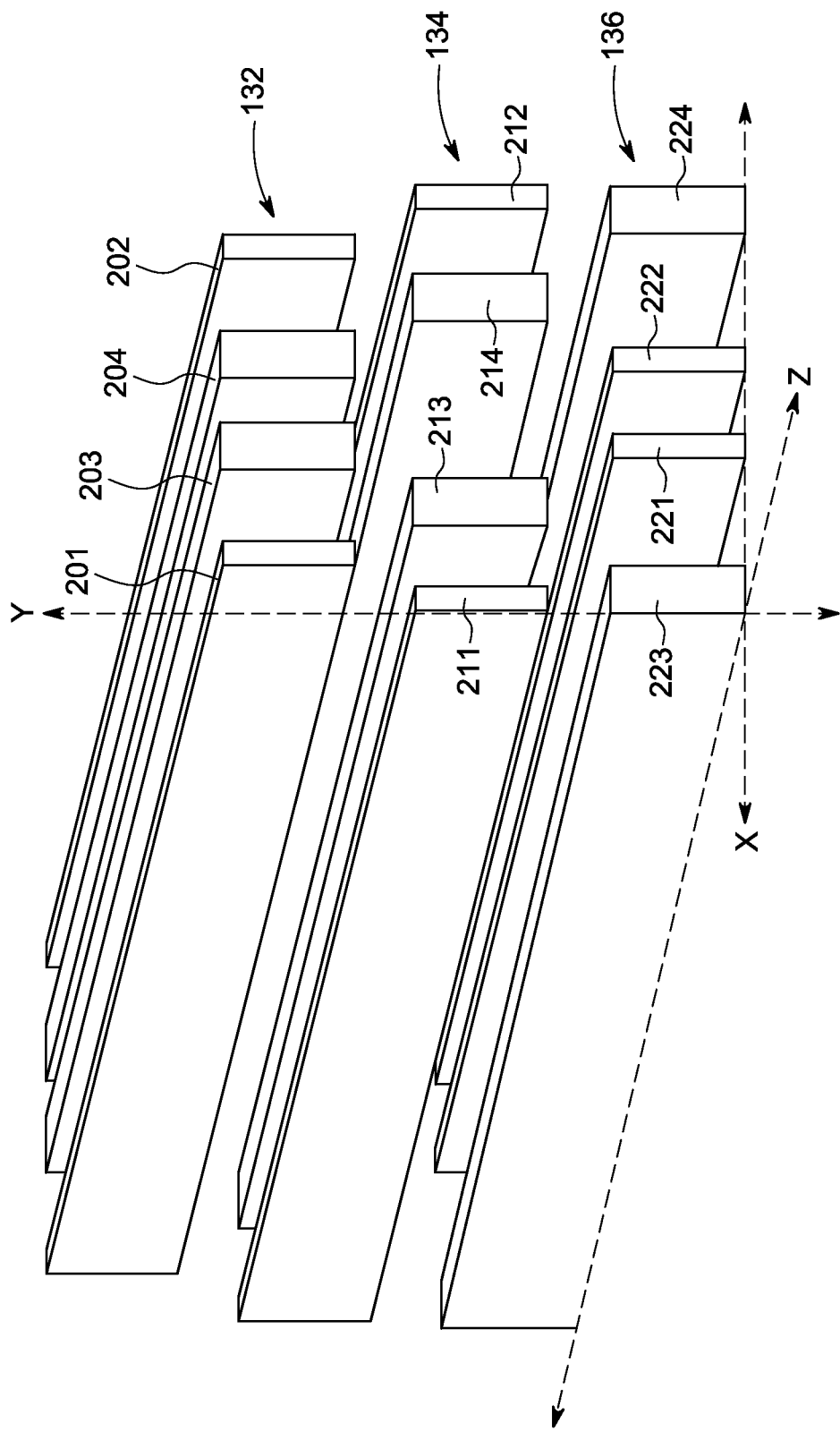
FIG. 2 is a perspective view of one segment of a bus bar assembly according to an embodiment of the invention.

Referring to FIG. 2, in embodiments of the invention, each main bus 132, 134 and 136 includes multiple bus bars of different sizes. Each main bus 132, 134 and 136 includes multiple bus bars arranged along a first axis X. The main buses are arranged along a second axis Y that is perpendicular to the first axis. In one embodiment, the first axis X is a horizontal axis and the second axis Y is a vertical axis. However, embodiments of the invention encompass any configuration of the X axis and Y axis relative to the ground. For example, in one embodiment, the X axis is arranged at an angle greater than zero (0) with respect to the ground. In addition, in embodiments of the invention the bus bars of the main buses 132, 134 and 136 extend along a third axis Z that is perpendicular to both the X axis and the Y axis. In the present specification and claims, reference to "a direction X" refers to a direction defined by the axis X and reference to "a direction Y" refers to a direction defined by the axis Y.

In embodiments of the invention, the bus bars of the main buses 132, 134 and 136 are arranged so that large-sized bus bars of each of the buses 132, 134 and 136 are offset from each other in the direction X. In other words, in an embodiment in which the first axis X is a horizontal axis and the second axis Y is a vertical axis, a large bus bar of the main bus 132 may be offset from a large bus bar of the main bus 134 in a horizontal direction X, such that the large bus bars are not vertically aligned. Similarly, a large bus bar of the main bus 136 may be offset from the main bus bars of the main buses 132 and 134 in the direction X. Since the large bus bars of each main bus 132, 134 and 136 are offset from each other in the direction X, ventilation of the main buses 132, 134 and 136 is facilitated when the main buses 132, 134 and 136 carry current which would generate heat in the main buses. In particular, since the large bus bars of the different main buses 132, 134 and 136, which carry more current than smaller bus bars, are offset from each other in the horizontal direction X, heat is readily dissipated in the spaces between bus bars of the adjacent main buses 132, 134 and 136.

The size of the bus bars is defined by a cross-sectional surface area of the bus bars. Accordingly, in the present specification and claims a "large" sized bus bar is defined as having a larger cross-sectional area than a small-sized bus bar. In other words, although the absolute cross-sectional area of bus bars in different bus bar assemblies may differ according to different design constraints, in each respective bus bar assembly a large bus bar has a cross-sectional area larger than a small bus bar in the same bus bar assembly. The bus bars are conductive bars, such as aluminum or copper. The configurations of each of the main buses 132, 134 and 136 will be described by referring to FIG. 2 and FIGS. 3A, 3B and 3C, respectively.

Figure 3A:
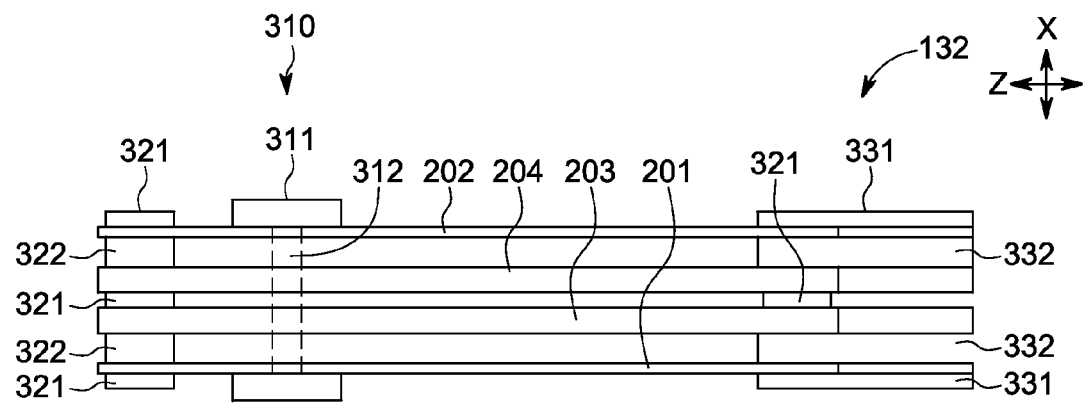
FIGS. 3A to 3C are top views of phases of a bus bar assembly according to an embodiment of the invention.

Referring to FIGS. 2 and 3A, the first main bus 132 includes small bus bars 201 and 202 and large bus bars 203 and 204. The small and large bus bars 201-204 all have a same height in a direction Y, but the large bus bars 203 and 204 have a larger width in the direction X, and consequently they have a larger cross-sectional surface area than the small bus bars 201 and 202. The small bus bars 201 and 202 are located at outside ends of the first main bus 132 in the direction X, such that the small bus bar 201 defines one end of the first main bus 132 in the direction X and the small bus bar 202 defines an opposite end of the first main bus 132 in the direction X. The large bus bars 203 and 204 are located on an inside of the first main bus 132 in the direction X.

Referring to FIG. 3A, the large bus bars 203 and 204 are separated by narrow spacers 321, which may be conductive spacers, such as copper spacers. The large bus bars 203 and 204 are separated from the small bus bars 201 and 202, respectively, by wide spacers 322. In addition, narrow splice joints 331 and wide splice joints 332 are illustrated at one end of the first main bus 132 in the length direction Z. The narrow and wide splice joints 331 and 332 facilitate the connection of the first main bus 132 with additional bus bars to extend the first main bus 132 or with other electrical components, including power supply sources, power monitoring circuitry and power receiving devices.

Figure 3B:
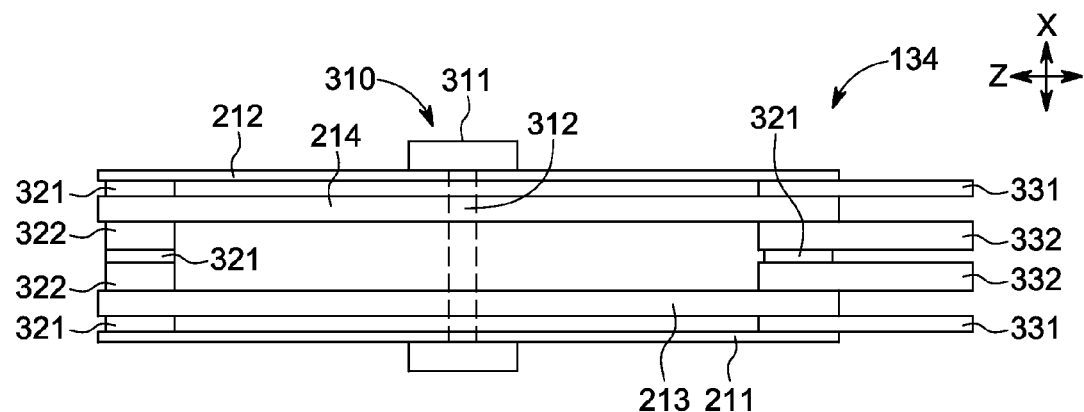

Referring to FIGS. 2 and 3B, the second main bus 134 includes small bus bars 211 and 212 located at an outside of the second main bus 134 in the direction X, and large bus bars 213 and 214 located at an inside of the second main bus 134 in the direction X. The large bus bars 213 and 214 are separated from the small bus bars 211 and 212, respectively, by narrow spacers 321 and the large bus bars 213 and 214 are separated from each other by large and small spacers 322 and 321. Consequently, referring to FIG. 2, the large bus bars 213 and 214 of the second main bus 134 are offset from the large bus bars 203 and 204 of the first main bus 132 in the direction X. In other words, the arrangement of the spacers 321 and 322 and the large bus bars 203, 204, 213 and 214 is such that the large bus bars 213 and 214 of the second main bus 134 are not aligned with the large bus bars 203 and 204 of the first main bus 132 in the direction X. In an embodiment in which the axis X defines a horizontal axis and the axis Y defines a vertical axis, the large bus bars 213 and 214 of the second main bus 134 are not aligned with the large bus bars 203 and 204 of the first main bus 132 along the horizontal axis X or along a vertical axis parallel to the axis Y.

Figure 3C:
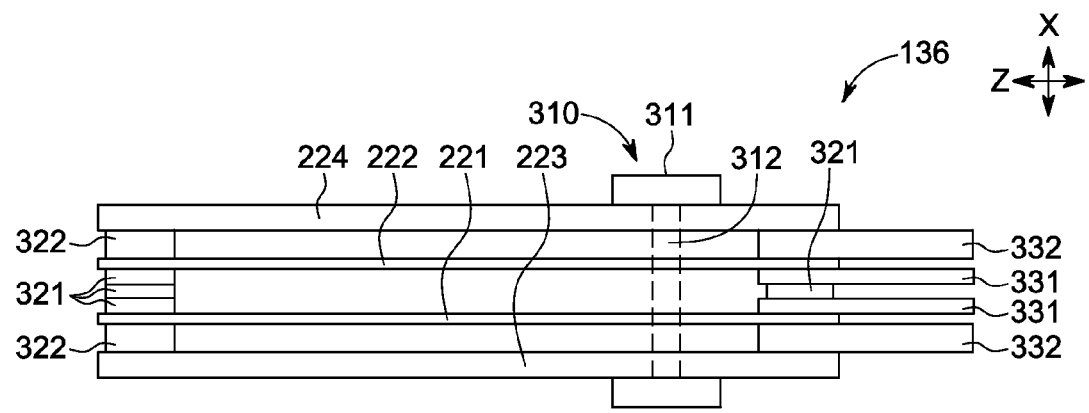

Referring to FIGS. 2 and 3C, the third main bus 136 includes small bus bars 221 and 222 located at an inside of the third main bus 136 in the direction X, and large bus bars 223 and 224 located at an outside of the third main bus 136 in the direction X. The large bus bars 223 and 224 are separated from the small bus bars 221 and 222, respectively, by wide spacers 322 and the small bus bars 221 and 222 are separated from each other by small spacers 321. Consequently, referring to FIG. 2, the large bus bars 223 and 224 of the third main bus 136 are offset from the large bus bars 203 and 204 of the first main bus 132 in the direction X. Similarly, the large bus bars 223 and 224 of the third main bus 136 are offset from the large bus bars 213 and 214 of the second main bus 134 in the direction X. In other words, the arrangement of the spacers 321 and 322 and the large bus bars 203, 204, 213, 214, 223 and 224 is such that the large bus bars 223 and 224 of the third main bus 136 are not aligned with any of the large bus bars 203, 204, 213 or 214 of the first main bus 132 and the second main bus 134 in the direction X. In an embodiment in which the axis X defines a horizontal axis and the axis Y defines a vertical axis, the large bus bars 223 and 224 of the third main bus 136 are not aligned with any of the large bus bars 203, 204, 213 or 214 of the first main bus 132 and the second main bus 134 in the horizontal direction X or along a vertical axis parallel to the axis Y.

In one embodiment of the invention, each of the first, second and third main buses 132, 134 and 136 has a same current rating. In addition, each of the first, second and third main buses 132, 134 and 136 has a same total cross-sectional area, viewed from the plane defined by the X and Y axes. In other words, the combined cross-sectional area of the bus bars 201-204 is the same as the combined cross-sectional area of the bus bars 211-214 and is also the same as the combined cross-sectional area of the bus bars 221-224.

In one embodiment, each of the first, second and third main buses 132, 134 and 136 includes a same number of bus bars of each size. In FIG. 2, each bus 132, 134 and 136 includes two small bus bars 201, 202, 211, 212, 221 and 222 and two large bus bars 203, 204, 213, 214, 223 and 224. However, embodiments of the invention encompass any number of small bus bars and large bus bars, and bus bars of more than two sizes or shapes.

For purposes of description, the width of the first, second and third main buses 132, 134 and 136 is defined by the outermost sides of the outermost bus bars or spacers 321 or 322 of each main bus 132, 134 and 136. In one embodiment, the width of each of the first, second and third main buses 132, 134 and 136 is the same. For example, referring to FIGS. 3A to 3C, the width in the direction X defined by the outermost spacers 321 of FIG. 3A is the same as the width defined by the outsides of the small bus bars 211 and 212 of FIG. 3B, which is the same as the width defined by the outsides of the large bus bars 223 and 224 of FIG. 3C.

In another embodiment, the widths of the different main buses 132, 134 and 136 varies, but the widths overlap each other in a horizontal direction. In operation, when current flows through the bus bars 201-204, 211-214 and 221-224, the large bus bars 203, 204, 213, 214, 223 and 224 generate more heat than the small bus bars 201, 202, 211, 212, 221 and 222. Since the main buses 132, 134 and 136 are arranged vertically, or substantially vertically, with one bus located above another, the heat from the lower buses flows up to the upper buses. When bus bars are located immediately above and below each other, venting of the heat is inhibited, which may affect power transmission characteristics of the bus bars.

In embodiments of the invention, since the large bus bars 203, 204, 213, 214, 223 and 224 are offset from each other, the effects of the heat from lower bus bars on the upper bus bars is reduced and ventilation of hot air generated by the bus bars is improved. However, since each main bus 132, 134 and 136 includes multiple bus bars of different sizes, the current ratings of each of the main buses 132, 134 and 136, corresponding to the total cross-sectional area of all of the bus bars of each main bus 132, 134 and 136, may be the same.

Directional axes X, Y and Z have been provided in the figures, and referred to in the description, as "horizontal," "vertical" and "depth" axes for purposes of description. However, it is understood that embodiments of the invention encompass various alignments of components that are not horizontal or vertical with respect to the ground. Main bus bars 132, 134 and 136 may be aligned at an angle other than horizontal and auxiliary bus bars may be aligned at angles other than vertical, and other than perpendicular to the main bus bars 132, 134 and 136.

FIGS. 3A to 3C also illustrate connectors 310 including outer portions 311 and a conductive bar 312 extending between the outer portions to represent a location where the auxiliary buses 141, 142 and 143 of FIG. 1 connect to the main buses 132, 134 and 136. However, the connectors 310 are provided for purposes of illustration only, and embodiments of the invention encompass any type of connectors located on outsides of the main buses 132, 134, 136 or located between bars of the main buses 132, 134 and 136. In other words, the manner in which the auxiliary buses 141, 142 and 143 connect to the main buses 132, 134 and 136 is not limiting of the present invention.

FIG. 2 illustrates bus bars 201-204, 211-214 and 221-224 including small rectangular bus bars 201, 202, 211, 212, 221 and 222 and large rectangular bus bars 203, 204, 213, 214, 223 and 224. However, embodiments of the invention are not limited to the rectangular bus bars illustrated in FIG. 2, but embodiments of the invention encompass bus bars of any shape and size. FIGS. 4A to 4D illustrate some examples of bus bars of different shapes arranged according to embodiments of the present invention.

Figure 4A:
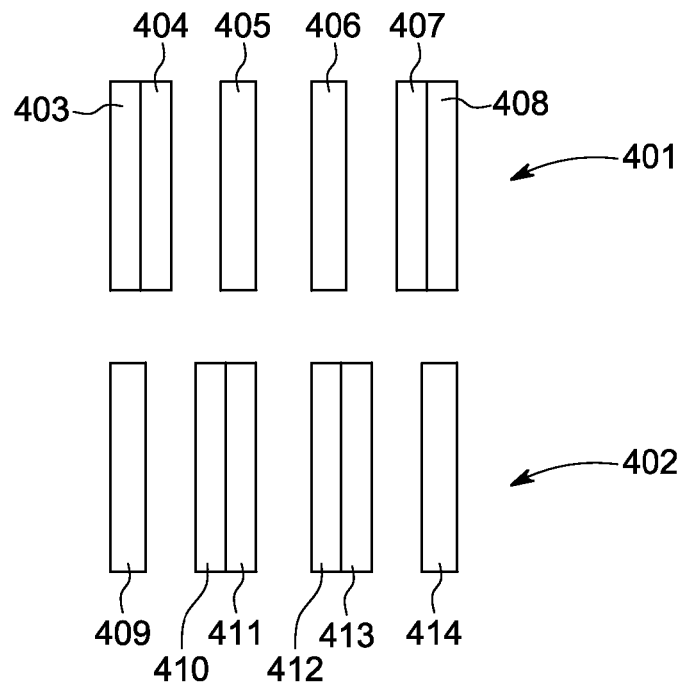
FIGS. 4A to 4D illustrate different shapes of bus bars according to embodiments of the invention.

Referring to FIG. 4A, large bus bars may be formed by mating two bus bars of the same size. In particular, in FIG. 4A, a first main bus 401 includes bus bars 403-408 and a second main bus 402 includes bus bars 409-414. The bus bars 403-414 are all of a same size. Large bus bars are formed by joining the bus bars 403 and 404, 407 and 408, 410 and 411 and 412 and 413, respectively. The bus bars may be joined by only physical contact, in which case no adhesive or weld is used, but rather spacers are used to ensure that the bus bars 403 and 404, 407 and 408, 410 and 411 and 412 and 413 are maintained in contact with each other to form large bus bars. As illustrated in FIG. 4A, in embodiments of the invention, the large bus bars of the second main bus 402 formed by the combination of bus bars 410 and 411 and 412 and 413 are offset from, or not vertically aligned with, the large bus bars of the first main bus 401 formed by the combination of bus bars 403 and 404 and 407 and 408.

Figure 4B:
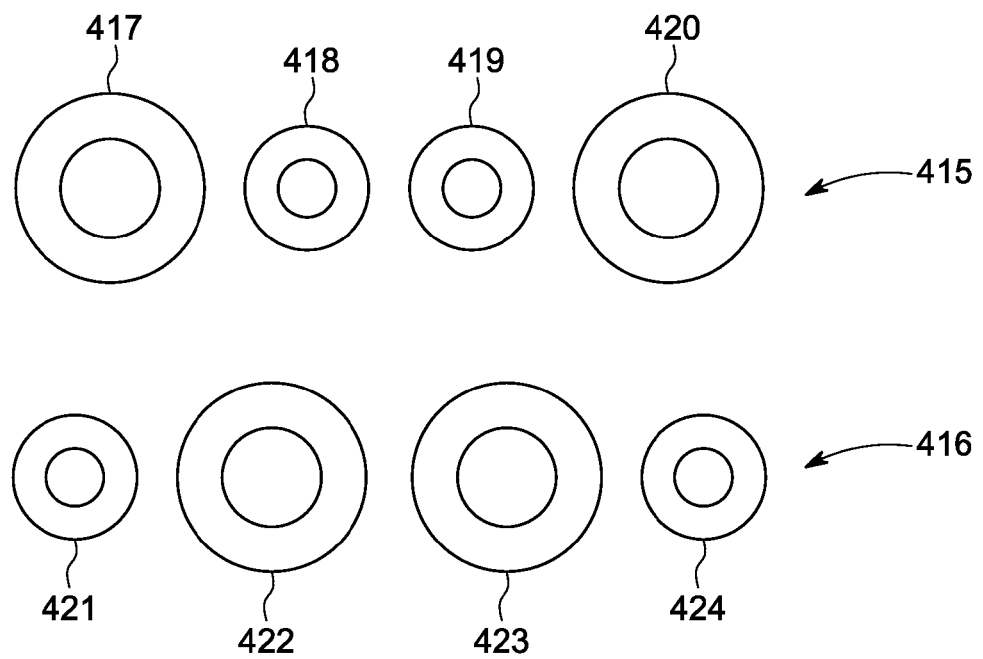

Referring to FIG. 4B, the bus bars may have a cylindrical shape or a hollow cylindrical shape to form a ring-shaped cross-section. A first main bus 415 includes large bus bars 417 and 420 located on an outside of the first main bus 415 and small bus bars 418 and 419 located on an inside of the first main bus 415. A second main bus 416 includes large bus bars 422 and 423 located on an inside of the second main bus 416 and small bus bars 421 and 424 located on an outside of the second main bus 416. Accordingly, the large bus bars 417 and 420 are offset from, or not vertically aligned with, the large bus bars 422 and 423 of the second main bus 416.

Figure 4C:
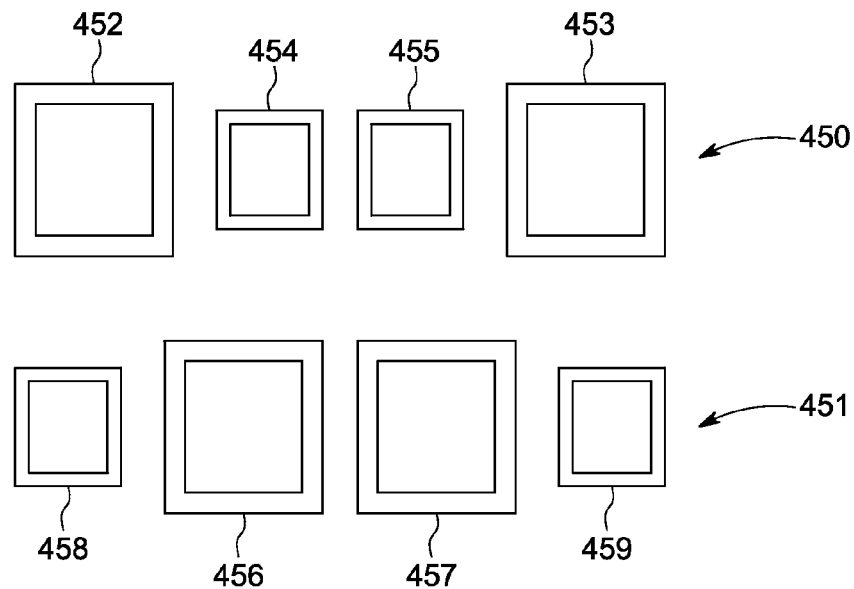

Referring to FIG. 4C, the bus bars may have square shapes. A first main bus 450 includes large bus bars 452 and 453 located on an outside of the first main bus 450 and small bus bars 454 and 455 located on an inside of the first main bus 450. A second main bus 451 includes large bus bars 456 and 457 located on an inside of the second main bus 451 and small bus bars 458 and 459 located on an outside of the second main bus 451. Accordingly, the large bus bars 452 and 453 of the first main bus 450 are offset from, or not vertically aligned with, the large bus bars 456 and 457 of the second main bus 451.

Figure 4D:
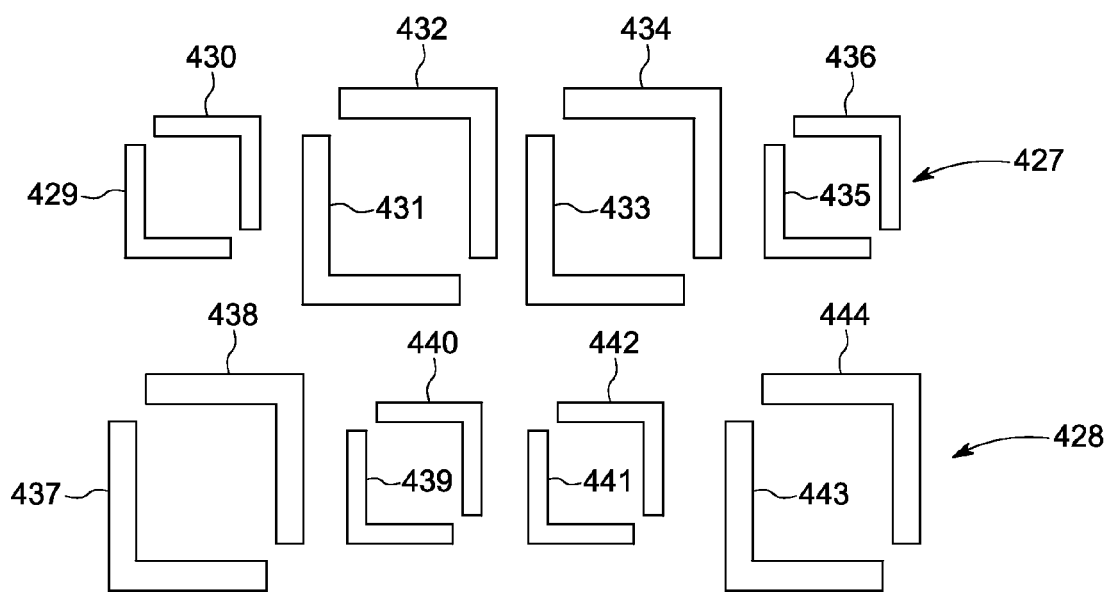

Referring to FIG. 4D, the bus bars may have "L" shapes, or elbow-shapes. A first main bus 427 includes large bus bars 431, 432, 433 and 434 located on an inside of the first main bus 427 and small bus bars 429, 430, 435 and 436 located on an outside of the first main bus 427. A second main bus 428 includes large bus bars 437, 438, 443 and 444 located on an outside of the second main bus 428 and small bus bars 439, 440, 441 and 442 located on an inside of the second main bus 428. Accordingly, the large bus bars 431, 432, 433 and 434 of the first main bus 427 are offset from, or not vertically aligned with, the large bus bars 437, 438, 443 and 444 of the second main bus 428.

While a few shapes of bus bars are illustrated in FIGS. 2 and 4A to 4D, embodiments of the invention encompass any shape, including "T" shapes, "D" shapes, any other polygonal shapes, irregular and non-polygonal shapes, and any other desired shape. In embodiments of the invention, each main bus corresponding to a separate phase has a same total cross-sectional area, regardless of the number of bus bars in each separate main bus. In addition, each main bus corresponding to a separate phase has a same total cross-sectional area, regardless of the shapes or sizes of the bus bars in each of the main buses.

Figure 5:
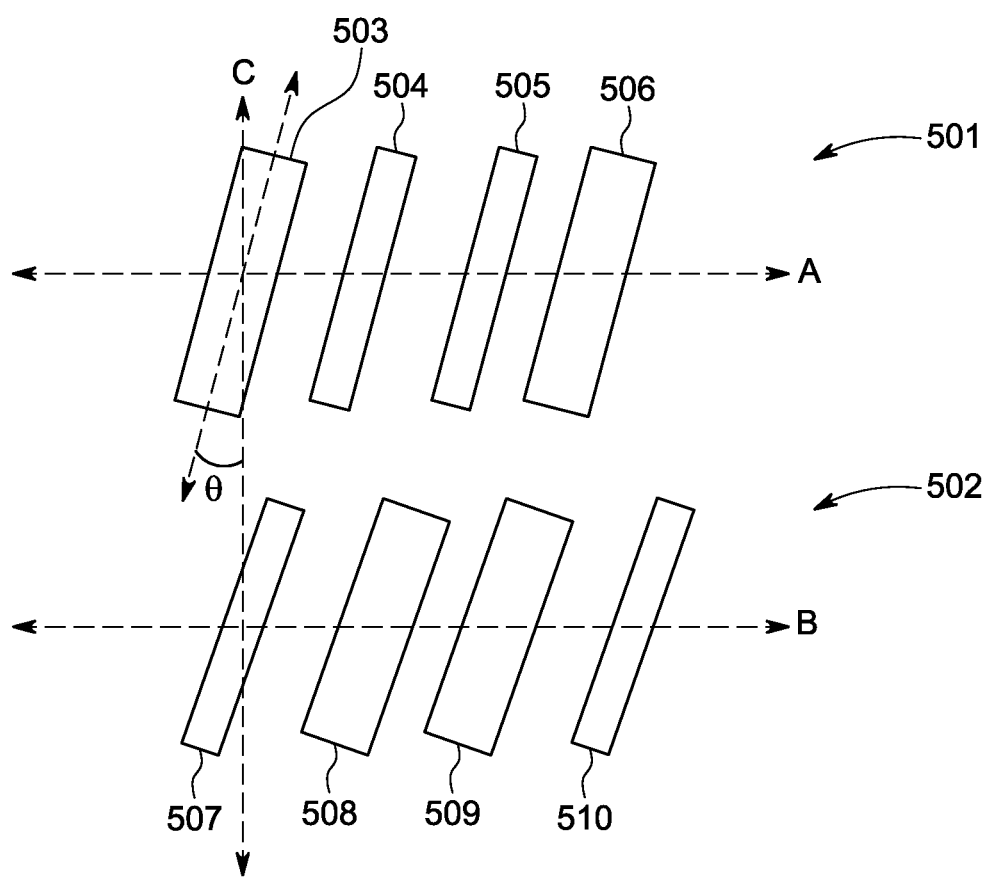
FIG. 5 illustrates a slanted arrangement of bus bars according to an embodiment of the invention.

FIG. 5 illustrates a configuration of a first main bus 501 and a second main bus 502 according to another embodiment of the invention. The first main bus 501 includes large bus bars 503 and 506 and small bus bars 504 and 505 arranged horizontally along the axis A. The large bus bars 503 and 506 are located on the outside of the first main bus 501 and the small bus bars 504 and 505 are located on the inside of the first main bus 501. The second main bus 502 includes large bus bars 508 and 509 and small bus bars 507 and 510 arranged horizontally along the axis B, which is parallel to the axis A. The large bus bars 508 and 509 are located on the inside of the second main bus 502 and the small bus bars 507 and 510 are located on the outside of the second main bus 502.

A vertical axis C is normal to the horizontal axis A, and the bus bars 503-510 are slanted at an angle θ relative to the vertical axis C. In embodiments of the invention, the bus bars 503-510 may be arranged at any angle θ relative to the vertical axis C. In addition, in embodiments of the invention, the large bus bars 508 and 509 of the second main bus 502 are offset from the large bus bars 503 and 506 of the first main bus 501.

According to embodiments of the invention, a power transmission assembly includes a first main bus including a first large bus bar and a first small bus bar, and the first large bus bar has a cross-sectional area larger than the first small bus bar. The first main bus defines a first axis passing through the first large bus bar and the first small bus bar. The power transmission assembly also includes a second main bus including a second large bus bar and a second small bus bar. The second main bus defines a second axis passing through the second large bus bar and the second small bus bar. The second axis is substantially parallel to the first axis. The first main bus is located along a third axis substantially perpendicular to the first axis and passing through each of the first main bus and the second main bus. As described above, the first axis defined by the first main bus and the second axis defined by the second main bus may be parallel to each other or substantially parallel to each other, meaning they are generally aligned but may form a small acute angle (such as less than five degrees) with respect to each other. Likewise the third axis may be perpendicular to the first axis or substantially perpendicular to the first axis, such as within around five degrees of ninety degrees.

According to embodiments of the invention, a first main bus may be located above a second main bus in a vertical direction. Each of the first main bus and the second main bus may include a large bus bar and a small bus bar. In addition, the cross-sectional area of each of the first and second main buses may be the same. In embodiments of the invention, the large bus bars of the first and second main buses are offset with respect to each other. A large bus bar of the first main bus is offset from a large bus bar of the second main bus in a horizontal direction, such that the large bus bars are not aligned vertically.

While embodiments of the invention have been described by referring to main buses arranged horizontally or substantially horizontally, embodiments of the invention encompass any arrangement of the main buses in which one main bus is capable of being arranged above another main bus in a vertical direction. For example, the main buses may be arranged at a non-horizontal angle or may have irregular shapes including straight portions, curved portions, bends or any other shapes along the length of the main buses. In addition, while some embodiments have been described with reference to power transmission systems for controlling motors, embodiments of the invention encompass any system for supplying power via conductive bars, and particular multiple buses of conductive bars stacked vertically one above the other.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A power transmission assembly, comprising:
   a first main bus including a first large bus bar and a first small bus bar, the first main bus and the first large bus bar and the first small bus bar configured to transmit a first phase of a power signal, the first large bus bar defined by a cross-sectional area larger than the first small bus bar, the first main bus defining a first axis passing through the first large bus bar and the first small bus bar; and
   a second main bus including a second large bus bar and a second small bus bar, the second main bus and the second large bus bar and the second small bus bar configured to transmit a second phase of the power signal, the second main bus defining a second axis passing through the second large bus bar and the second small bus bar, the second axis being substantially parallel to the first axis, and the first main bus being located along a third axis substantially perpendicular to the first axis and passing through each of the first main bus and the second main bus.

2. The power transmission assembly of claim 1, wherein the second large bus bar is offset from the first large bus bar in a first direction parallel to the first and second axes.

3. The power transmission assembly of claim 1, wherein a combined cross-sectional area of the first large bus bar and the first small bus bar is the same as a combined cross-sectional area of the second large bus bar and the second small bus bar.

4. The power transmission assembly of claim 1, further comprising:
   a third main bus including a third large bus bar and a third small bus bar, the third main bus and the third large bus bar and the third small bus bar configured to transmit a third phase of the power signal, the third main bus located beneath the first main bus and the second main bus, the third main bus defining a fourth axis passing through the third large bus bar and the third small bus bar, the fourth axis being parallel to the first axis and the second axis, and the third main bus being located along the third axis perpendicular to the first axis and passing through each of the first main bus, the second main bus and the third main bus.

5. The power transmission assembly of claim 4, further comprising:
   a motor connected to the first main bus, the second main bus and the third main bus, the motor configured to receive a three-phase power signal from the first main bus, the second main bus and the third main bus.

6. The power transmission assembly of claim 1, wherein the first main bus further comprises a fourth large bus bar and a fourth small bus bar,
the second main bus further comprises a fifth large bus bar and a fifth small bus bar, and
each of the first and fourth large bus bars of the first main bus is offset from each of the second and fifth large bus bars of the second main bus in a first direction parallel to the first and second axes.

7. The power transmission assembly of claim 6, wherein the first and fourth lame bus bars and first and fourth small bus bars of the first main bus are arranged symmetrically about a fifth axis parallel to the third axis, and
the second and fifth large bus bars and second and fifth small bus bars oldie second main bus are arranged symmetrically with respect to the fifth axis.

8. The power transmission assembly of claim 1, further comprising:
a first auxiliary bus connected to the first main bus; and
a second auxiliary bus connected to the second main bus, the first and second auxiliary buses configured to connect the first and second main buses to one of a power source and a power-consuming, device.

9. The power transmission assembly of claim 8, wherein the first auxiliary bus includes first and second auxiliary bus bars configured to physically contact different main bus bars of the first main bus; and
the second auxiliary bus includes third and fourth auxiliary bus bars configured to physically contact different main bus bars of the second main bus.

10. The power transmission assembly of claim 1, wherein the first and second large bus bars and first and second small bus bars each have a cross-sectional shape corresponding to one of a circle, a square and an "L".

11. A power transmission apparatus, comprising:
a first main bus including a first plurality of bus bars including at least one first large bus bar and at least one first small bus bar, the first main bus and the at least one first large bus bar and the at least one first small bus bar configured to transmit a first phase of a power signal, the large and small sizes defined by a cross-sectional area of the bus bars, the first main bus defining a first axis passing through each of the first plurality of bus bars; and
a second main bus including a second plurality of bus bars including at least one second large bus bar and at least one second small bus bar, the second main bus and the at least one second large bus bar and the at least one second small bus bar configured to transmit a second phase of the power signal, the second main bus defining a second axis passing through each of the second plurality of bus bars, the second axis being substantially parallel to the first axis, and the first main bus and the second main bus arranged such that a third axis substantially perpendicular to the first and second axes passes through each of the first main bus and the second main bus.

12. The power transmission apparatus of claim 11, wherein a combined cross-sectional area of the at least one first large bus bar and the at least one first small bus bar is the same as a combined cross-sectional area of the at least one second large bus bar and the at least one second small bus bar.

13. The power transmission apparatus of claim 11, further comprising:
a third main bus including a third plurality of bus bars including at least one third large bus bar and at least one third small bus bar, the third main bus and the at least one third large bus bar and the at least one third small bus bar configured to transmit a third phase of the power signal, the third main bus defining as fourth axis passing through each of the third plurality of bus bars, the fourth axis being parallel to the first axis, and the third main bus arranged such that the third axis passes through the third main bus.

14. The power transmission apparatus of claim 11, further comprising:
a first auxiliary bus connected to the first main bus; and
a second auxiliary bus connected to the second main bus, the first and second auxiliary buses configured to connect the first and second main buses to one of a power source and a power-consuming device.

15. The power transmission apparatus of claim 11, wherein the first and second large bus bars and first and second small bus bars each have a cross-sectional shape corresponding to one of a circle, a square and an "L".

16. The power transmission assembly of claim 2, wherein the first large bus bar is located above the second large bus bar, and the offset between the first large bus bar and the second large bus bar in the first direction parallel to the first and second axes defines a space above the second larger bus bar and adjacent to the first larger bus bar, and wherein a flow of heat generated second larger bus bar is vented parallel, to the first axis and dissipated the space.

17. The power transmission system of claim 11, wherein the first large bus bar is located above the second large bus bar, and the offset between the first large bus bar and the second large bus bar in the first direction parallel to the first and second axes defines a space above the second larger bus bar and adjacent to the first larger bus bar, and wherein a flow of heat generated second larger bus bar is vented parallel to the first axis and dissipated the space.

\* \* \* \* \*